United States Patent Office 3,563,956
Patented Feb. 16, 1971

3,563,956
PROCESS FOR THE MANUFACTURE OF POLYALKYLENE TEREPHTHALATES USING ZINC AMINO-TRIETHANOLATE AS TRANSESTERIFICATION CATALYST
Paul Hilaire, Lyon, France, assignor to Societe Rhodiaceta, Paris, France, a corporation of France
No Drawing. Filed Oct. 29, 1968, Ser. No. 771,624
Claims priority, application France, Oct. 30, 1967, 126,388
Int. Cl. C07c 67/02; C08g 17/013, 17/015
U.S. Cl. 260—75                                    5 Claims

ABSTRACT OF THE DISCLOSURE

In the production of filament- or film-forming polyalkylene terephthalates by transesterification followed by polycondensation, zinc aminotriethanolate is used as the transesterification catalyst, preferably in combination with the use of bismuth aminotriethanolamine as the polycondensation catalyst. Much smaller amounts of these catalysts can be used than of prior art catalysts, and the product has a high degree of thermal stability.

---

This invention relates to the manufacture of polyalkylene terephthalates by transesterification followed by polycondensation. It is known to prepare polyesters by an ester interchange (transesterification) between a lower alkyl diester of an aromatic dicarboxylic acid, in particular terephthalic acid, and a glycol of formula $$HO-(CH_2)_n-OH$$

in which $n$ is between 2 and 10 inclusive, followed by polycondensation. Also this type of polymer can be obtained by direct esterification of the diacid with an alkylene oxide, for example ethylene oxide followed by polycondensation.

In all cases the transesterification, esterification and polycondensation reactions are effected in the presence of catalysts which serve the purpose of accelerating the reactions and allowing polymers to be obtained which have properties enabling them to be used in the form of filaments, films or moulded articles.

Acetates of metals of groups II and VII of the Periodic Classification of the Elements, especially manganous acetate, are widely employed as transesterification catalysts, but it is necessary to incorporate a relatively high quantity of these to achieve sufficient catalytic effect for the reaction to take place within a fairly short time.

Antimony oxide is the most commonly employed of the polycondensation catalysts, but it has already been found that certain bismuth compounds have advantages over antimony oxides. In particular, bismuth aminotriethanolate makes it possible, to achieve high speeds of reaction using very small quantities of the metal. However, the resulting polymers are not pure white and have a relatively high yellowness index.

Further, the applicant has already proposed, in U.S. patent application Ser. No. 593,288 filed Nov. 10, 1966, now Pat. No. 3,475,379, to use triethanolamine as a polycondensation catalyst, optionally in the presence of phosphorous acid as a stabiliser, to give polymers having improved colour and heat stability.

It has now been found that polyesters of improved heat stability, such that the use of phosphorous acid as a stabiliser can be dispensed with, can be obtained by using as the transesterification catalyst zinc aminotriethanolate.

Accordingly the invention consists in a process for the production of polyalkylene terephthalates by effecting transesterification between a lower (e.g. $C_1$–$C_4$) alkyl ester of terephthalic acid and a polymethylene glycol having 2–10 carbon atoms in the molecule, and subjecting the resulting bis($\omega$-hydroxy-n-alkyl) terephthalate to polycondensation, in which the transesterification step is carried out in the presence of zinc aminotriethanolate as catalyst. The polycondensation stage is preferably carried out using bismuth aminotriethanolate as catalyst, in which case a very high degree of thermal stability in the solid state can be achieved without the use of phosphorous acid. If other polycondensation catalysts, e.g. triethanolamine itself, or even antimony oxide, are used, less advantage as regards heat stability is obtained.

This process makes it possible to prepare polymers having properties (intrinsic viscosity, number of terminal acid groups and softening point) as good as those of polymers prepared in the presence of known catalytic systems, using lower polycondensation temperatures.

Although the amounts of transesterification catalyst and polycondensation catalyst used can vary over a wide range, the superior activity of zinc aminotriethanolate and bismuth aminotriethanolate respectively enables them to be used in amounts considerably smaller than are usual for earlier catalysts. Thus the zinc compound can be used in amount 20 to 150 parts per million, and preferably 40 to 80 parts per million (reckoned as zinc), and the bismuth compound in amount 5 to 200, and especially 5 to 50, parts per million (reckoned as bismuth), both based on the weight of the ester of terephthalic acid (reckoned as dimethyl terephthalate).

The heat stability of the polyesters obtainable in accordance with the invention (evaluated from the change in intrinsic viscosity and in the number of terminal groups after 24 hours at 185° C.) is as good in the absence of stabilisers as that of polymers previously prepared in the presence of derivatives of the phosphorous oxyacids, in particular phosphorous acid, which are usually employed as stabilisers.

The polymers obtained can be formed into shaped articles, e.g. filaments or films, which have properties comparable to those of filaments or films obtained from the best polymers prepared by the processess already known, especially as regards yellowness index, brightness, tensile strength and elongation at break.

The following examples illustrate the invention.

EXAMPLES 1–3

Transesterification is first carried out in a 10 litre glass flask between 3,298 g. (17 mols) of dimethyl terephthalate and 2,635 g. (42.5 mols) of ethylene glycol in the presence of a transesterification catalyst. After distilling off the methanol and the excess ethylene glycol the reaction mixture is transferred to a 7.5 litre stainless steel autoclave provided with a stirrer system. The polycondensation catalyst and 0.5% by weight, relative to the polymer, of titanium oxide, both suspended in ethylene glycol, are then added to the reagents which are at a temperature of about 230° C. The reaction mixture is then heated at 250° C. at atmospheric pressure with stirring, whilst distilling off ethylene glycol. Heating is thereafter continued at a temperature rising from 250° C. to the temperature T chosen for the polycondensation whilst progressively lowering the pressure in the autoclave to about 2.5 mm. of mercury. Finally, in a last stage, termed hereinafter the "polycondensation stage," the pressure is further lowered to 0.2 mm. of mercury whilst keeping the reaction mixture at the temperature T. The length of this last stage varies with the nature of the catalysts.

The catalysts used, and the conditions in the polycondensation stage, are shown in Table I, from which it will be seen that in the case of the catalytic system of the invention both the temperature and the duration of the polycondensation stage are less, even though smaller amounts of transesterification and polycondensation catalyst, are used.

TABLE III

| | Polycondensation phase | | Polymer properties | | | | | | Filament properties | | | |
|---|---|---|---|---|---|---|---|---|---|---|---|---|
| Example No. | Temp., °C. | Duration | V.I.[4] | G.T. COOH[5] | P.R., °C.[6] | After 24 hrs. heat treatment at 185° C. | | Yellowness index | Brightness, percent | Yellowness index | Brightness, percent | Tensile strength, g./den. | Elongation, percent |
| | | | | | | ΔV.I. | ΔG.T. COOH | | | | | | |
| 1 | 280 | 2 hours 30 mins. | 0.67 | 26 | 262.5 | 0.08 | 14 | 11 | 51.2 | 10.5 | 83.2 | 5.48 | 19.2 |
| 2 | 287 | do | 0.66 | 35 | 261.2 | 0.04 | 2 | −1 | 45 | 6 | 85.5 | 5.33 | 20.2 |
| 3 | 287 | do | 0.68 | 38 | 261.9 | 0.07 | 6 | 6 | 48.5 | | | | |

See footnotes at end of Table IV.

TABLE I

| | Trans-esterification catalyst | | Polycondensation catalyst | | H₃PO₃ Content[1] | Polycondensation stage | |
|---|---|---|---|---|---|---|---|
| | Nature | Amount[1] | Nature | Amount[1] | | Temp., °C. | Duration |
| Example No.: | | | | | | | |
| 1 | ATZn[2] | 54 | ATBi[3] | 50 | 0 | 280 | 1 hour 17. |
| 2 | Manganous acetate. | 109 | Sb₂O₃ | 338 | 134 | 287 | 1 hour 43. |
| 3 | Calcium acetate. | 179 | Sb₂O₃ | 338 | 134 | 287 | 1 hour 40. |

See footnotes at end of Table IV.

Table II summarises the properties of the polymers obtained under the conditions shown in Table I as well as the properties of filaments formed from these polymers by extrusion, usually melt extrusion.

TABLE II

| | Polymer properties | | | | | | Filament properties | | | | |
|---|---|---|---|---|---|---|---|---|---|---|---|
| Example No. | V.I.[4] | G.T. COOH[5] | P.R., °C.[6] | After 24 hrs. heat treatment at 185° C. | | Diethylene glycol content, percent | Yellowness index | Brightness, percent | Yellowness index | Brightness, percent | Tensile strength, g./den. | Elongation, percent |
| | | | | ΔV.I. | ΔG.T. COOH | | | | | | | |
| 1 | 0.67 | 25.5 | 261.5 | 0.06 | 9 | 0.70 | 2.7 | 48 | 3 | 79.6 | 5.9 | 15 |
| 2 | 0.66 | 22.3 | 263.4 | 0.04 | 8 | 0.54 | −4 | 45.7 | 1.8 | 77 | 5.25 | 17 |
| 3 | 0.67 | 25.3 | 262.9 | 0.05 | 9.5 | 0.41 | 4 | 54.7 | 4 | 81.4 | 5.17 | 17 |

See footnotes at end of Table IV.
NOTE.—The principle of the determination is explained by O. B. Edgar and E. Ellery, J. Chem. Soc., 2,633–2,638, 1952.

It will be seen from this table that when zinc aminotriethanolate is used as the transesterification catalyst and bismuth aminotriethanolate as the polycondensation catalyst, the viscosity properties of the polymer and the properties of the filaments remain similar to those achieved with the catalytic systems used by way of comparison while it is unnecessary to incorporate phosphorous acid.

Polymers were also produced in a 300 litre autoclave using the same catalyst systems.

The results are summarised in Table III, which again shows that the catalytic system of the invention makes it possible to work at a lower temperature than is necessary with the comparison systems without increasing the duration of the polycondensation. The properties of the polymer and of the filaments remain similar.

The catalyst systems used were:

| Example | Trans esterification | Polycondensation |
|---|---|---|
| 4 | Manganous acetate | Bismuth aminotriethanolate. |
| 5 | Zinc amino-triethanolate | Do. |

Polymers were prepared in a 2,000 litre autoclave from 1,150 kg. of dimethyl terephthalate and 720 kg. of ethylene glycol by the general method of Example I. Table IV summarises the working conditions and the results obtained and clearly shows the advance achieved by the invention.

The catalytic system of the present invention produces polymers of improved heat stability, shown by the small

TABLE IV

| | Transesterification catalyst | | Polycondensation catalyst | | Polycondensation stage | | Polymer properties | | | | | | |
|---|---|---|---|---|---|---|---|---|---|---|---|---|---|
| Example No. | Nature[1] | Amount[1] | Nature[1] | Amount[1] | Temp., °C. | Duration | V.I.[4] | G.T. COOH[5] | P.R., °C.[6] | After 24 hrs. heat treatment at 185° C. | | Yellowness index | Brightness, percent |
| | | | | | | | | | | ΔV.I. | ΔG.T. COOH | | |
| 4 | Manganous acetate. | 109 | ATBi[3] | 20 | 287 | 4 hours | 0.66 | 45 | 262 | 0.17 | 115 | 22 | 53.8 |
| 5 | AtZn[2] | 54 | ATBi[3] | 50 | 283 | 4 hrs. 40 mins. | 0.66 | 45 | 261.3 | 0.08 | 12 | 13 | 46.3 |

[1] Parts by weight per million of zinc, manganese, calcium, bismuth, antimony or phosphor us relative to dimethyl terephthalate.
[2] ATZn=Zinc aminotriethanolate.
[3] ATBi=Bismuth aminotriethanolate.
[4] V.I.=Intrinsic viscosity determined at 25° C. on a 1% weight/volume solution of polymer in o-chlorophenol.
[5] G.T. COOH=Number of terminal COOH groups per ton of polymer.
[6] P.R.=Softening point measured by penetrometric method.

reduction in intrinsic viscosity and increase in the number of carboxyl terminal groups after heat treatment.

We claim:
1. A process for the manufacture of filament- or film-forming polyalkylene terephthalates of improved heat stability which includes the steps of effecting transesterification between a lower alkyl ester of terephthalic acid and a polymethylene glycol having 2–10 carbon atoms in the molecule, followed by polycondensation, in which 20 to 150 parts by weight of zinc in the form of a zinc aminotriethanolate are used as a catalyst for the transesterification step, per million parts by weight of lower alkyl ester of terephthalic acid, reckoned as dimethyl terephthalate.

2. A process according to claim 1, in which 5 to 200 parts by weight of bismuth in the form of bismuth aminotriethanolate are used as a catalyst in the polycondensation step per million parts by weight of lower alkyl ester of terephthalic acid, reckoned as dimethyl terephthalate.

3. A process according to claim 1, in which the ester of terephthalic acid is dimethyl terephthalate, and the glycol is ethylene glycol.

4. A process according to claim 2, in which the ester of terephthalic acid is dimethyl terephthalate, and the glycol is ethylene glycol.

5. A process according to claim 2, in which 40 to 80 parts by weight of zinc in the form of zinc amino-triethanolate and 5 to 50 parts by weight of bismuth in the form of bismuth aminotriethanolate are used, both per million parts by weight of the lower alkyl ester of terephthalic acid, reckoned as dimethyl terephthalate.

References Cited

UNITED STATES PATENTS 3,405,096  10/1968  Chambion _____ 260—75

WILLIAM H. SHORT, Primary Examiner

L. P. QUAST, Assistant Examiner

U.S. Cl. X.R.

260—45.75, 475